April 25, 1939.

PETER-FRANZ GRAF BOPP VON OBERSTADT, NOW BY JUDICIAL
CHANGE OF NAME PETER BOPP OBERSTADT 2,155,978

SHOCK ABSORBER

Filed Feb. 8, 1937

INVENTOR.
Peter-Franz Graf Bopp von Oberstadt.
BY
Kwis Hudson & Kent
ATTORNEYS

Patented Apr. 25, 1939

2,155,978

UNITED STATES PATENT OFFICE 2,155,978

SHOCK ABSORBER

Peter-Franz Graf Bopp von Oberstadt, Cleveland, Ohio, now by judicial change of name Peter Bopp Oberstadt Application February 8, 1937, Serial No. 124,639
In Germany February 8, 1936

12 Claims. (Cl. 188—88)

This invention relates to a shock absorber, and particularly to a hydraulic shock absorber wherein there is a piston which is relatively movable with respect to a pressure cylinder.

Although the invention may be utilized with other types of shock absorbers, it will be explained herein in connection with a shock absorber of the direct acting type, that is one of the movable parts of the shock absorber will be directly connected to the frame of the vehicle upon which it is mounted and the other of the movable parts thereof will be connected to the axle of the vehicle, and relative movement between said frame and axle when the springs of the vehicle are compressed will cause said parts to telescope with respect to each other, thus effecting relative movement between the piston and the pressure or working cylinder of the shock absorber. The piston is carried by a piston rod extending into the cylinder and there is a seal arranged within the cylinder adjacent the upper end thereof to prevent the escape of oil around the rod during the operation of the shock absorber.

It has been extremely difficult in a direct acting shock absorber to prevent the leakage of oil therefrom around the piston rod, since the direct acting shock absorber operates with a long stroke that causes considerable foaming of the oil in the pressure chamber, with a resultant tendency for the oil to leak therefrom. Particularly is this true in the direct acting shock absorber under the very quick movements that result from axle "flutter" which upon occasion attain a rapidity of 200 to 250 strokes per minute. In the direct acting shock absorber the piston rod must be guided through a bushing in the upper part of the pressure chamber of the shock absorber, and even when the piston rod has the best possible finish and the bushing through which it passes the smallest possible tolerances, considerable wear results between these parts. This wear will cause clearance through which the oil will pass at high velocity into the small air filled area above the cylinder or working chamber. As a result of this a large volume of foam is quickly produced and the entire oil volume of the shock absorber will eventually be turned into foam. Naturally, this causes the car upon which the shock absorber is mounted to have bad riding qualities and also brings about a loss of oil which when it has become substantial results in the loss of braking or shock absorbing action.

One of the main objects of the present invention is to provide a direct acting shock absorber wherein means is provided for venting the air from the upper part of the working cylinder to prevent the creation of foam therein, such venting means also acting to remove any foam which is created in the pressure cylinder or working chamber by the action of the shock absorber in use.

Another object of the invention is to provide a shock absorber wherein there is employed a relatively movable pressure cylinder and a piston within the cylinder carried by a rod projecting outwardly of the cylinder, in combination with a sealing device to prevent the leakage of oil or other fluid around the rod to the outside of the cylinder, together with means for venting from the cylinder the air or other gas entrained in the oil or fluid to thereby eliminate the tendency of the oil in the shock absorber to foam or emulsify.

An additional object is to provide a shock absorber such as specified in the object just above named, wherein the functioning of the air venting device utilizes the differential in the dynamic pressures of the air or other gases and the oil or other fluid in the shock absorber during the operation of the latter, thus permitting the escape of the air or other gases and the foam from the high pressure cylinder or working chamber, while preventing the escape of the oil therefrom.

A further object is to provide in a shock absorber such as specified in the above referred to objects, an air or foam venting device which functions properly even when the shock absorber is disposed at an angle to the vertical.

Further and additional objects and advantages not hereinbefore referred to will become apparent hereinafter during the following detailed disclosure of several embodiments of the invention which are illustrated in the accompanying drawing wherein, Fig. 1 is a longitudinal sectional view through the shock absorber when the telescoping parts thereof are in their most inward or collapsed position with certain parts of the shock absorber broken away to contract in the drawing the longitudinal length of the instrument.

As already stated, the shock absorber illustrated herein and with which the invention has particular utility, is of the direct acting long stroke and low pressure type and comprises at its opposite ends attaching eyes 10 and 11, which are adapted to be connected, respectively, with the frame and the axle of a motor vehicle, as will be well understood in the art. The eye 11 is connected with a pressure or working cylinder 12 surrounding which and spaced outwardly with respect thereto is a housing 13. It will be understood that the lower ends of the cylinder 12 and housing 13 are connected together in sealed relationship and that the space between the cylinder 12 and housing 13 constitutes a reservoir for the oil or other fluid used in the shock absorber.

Figure 1:
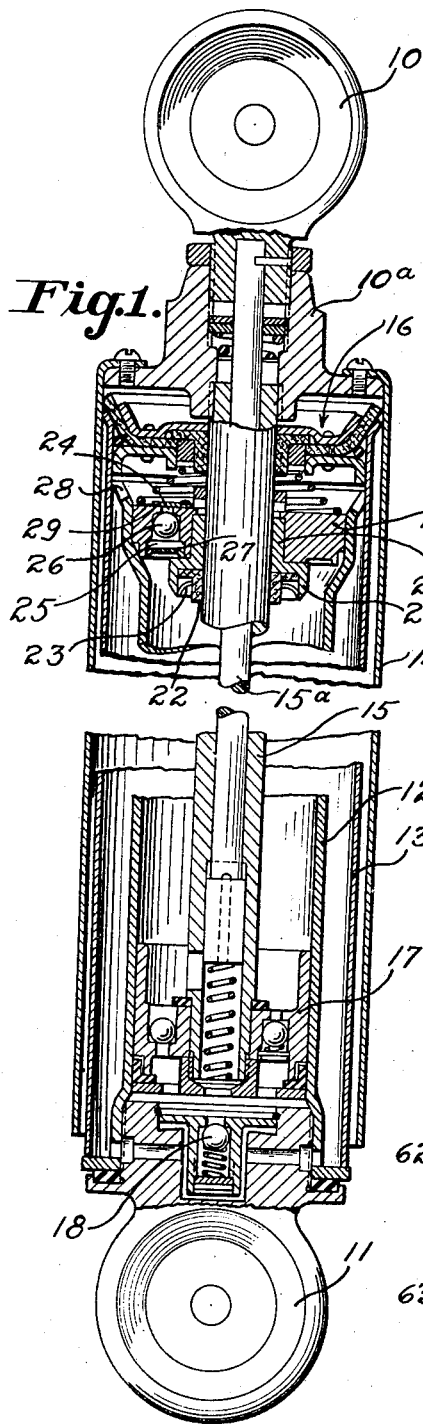

The eye 10 is connected through a plug portion 10a with a tubular shield or sleeve member 14 that surrounds, in spaced relation, the housing 13 and substantially covers the same when the parts of the telescoping shock absorber are in their most inward or collapsed position as shown in Fig. 1. The eye 10 is also connected to a piston rod 15 constituting in part a sleeve in which is arranged a smaller rod 15a, as clearly shown in Fig. 1, and said piston rod 15 slidably extends through a sealing closure at the upper end of the cylinder 12 and indicated generally by the reference character 16. The lower end of the piston rod 15 is connected to a piston 17 that slides with a working fit in the cylinder 12.

It will be understood that inasmuch as the eye 10 is connected to the chassis or frame of the vehicle, and the eye 11 to the axle thereof, the relative movements between the frame or chassis and the axle of the vehicle, due to the passage of the latter over a roadway, will cause a reciprocation of the piston 17 within the cylinder 12 and also a telescoping movement of the sleeve 14 with respect to the housing 13.

The cylinder 12 is sealed at its lower end by a spring-pressed valve shown as a ball valve 18, wherefore as the piston 17 descends in the cylinder, due to the relative movement of the parts of the shock absorber in use, the displacement of the oil by the rod causes the valve 18 to be unseated and the oil or other fluid thus displaced to be forced from the cylinder into the reservoir formed by the space between the cylinder and the housing 13 as will be well understood in the art.

Inasmuch as the manner in which the oil or fluid is valved from and to the reservoir and into or from the interior of the cylinder and also the manner in which the oil or fluid is valved through the movable piston 17 during the reciprocation of the latter within the cylinder form no part of the present invention, it should be sufficient to say that as the piston moves back and forth within the cylinder provision is made for the transference of oil or fluid from one side of the piston to the other side thereof at such rates that predetermined and desired resistances will be set up to the movement of the piston in opposite directions within the cylinder, as will be well understood in the art.

A sealing plug 19 is located within the cylinder 12 inwardly of the sealing portion 16 thereof, and said plug surrounds a bushing 20 through which the piston rod 15 slides, while said bushing is provided at its lower end with an enlarged cup-shaped portion 21 within which is mounted a sealing gasket 22 that engages the piston rod 15 and is held in tight engagement therewith by means of a spring 23. Due to the spring 23 the gasket or washer 22 is self-tightening on the piston rod, and as the latter reciprocates through the bushing 20 during use the gasket or washer prevents oil from working through along the piston rod to the exterior of the cylinder, it being understood that the seal provided by said gasket or washer is augmented or backed up by the seal or washer that surrounds the piston rod 15 and forms a part of the sealing device 16 at the end of the cylinder.

The seals thus provided prevent the escape of oil as the piston rod reciprocates and hence the creation of foam in the cylinder or working chamber 12. The seals also prevent the escape of air or other gas which might be present in the upper end of the cylinder 12 or entrained in the oil in the cylinder.

It is necessary, therefore, to provide some means whereby this air or other gas and any foam can be vented or scavenged from the cylinder 12, otherwise the oil in the cylinder 12 would be quickly emulsified or whipped into a foamy condition by the movement of the piston therein and it would be difficult to maintain the seal against leakage of oil. Furthermore, since the cylinder 12 should be completely filled with oil while the level of the oil in the reservoir would be much lower, the air compressed within the cylinder unless allowed to escape would tend to cause an equalization between the levels of the oil in the reservoir and the cylinder when the shock absorber stood idle over relatively long periods of time.

In order to provide for the venting of the air from the cylinder as the piston 17 moves towards the upper end thereof, during such portions of its working stroke, the plug 19 is provided with a small port or bore 24 connected with an enlarged counterbore 25 forming a cage for a ball valve 26 which can seal the port 24 and which is held in the counterbore or cage 25 by means of a retaining plate 27 that is provided with one or more openings as desired and which is pressed into the counterbore 25 and held therein as shown in Fig. 1. As the piston 17 moves upwardly in the cylinder 12 the air in the cylinder or the air entrained in the oil or fluid will be compressed above the oil, but since the dynamic pressure of this air is relatively low, as compared to the dynamic pressure of the flowing oil, the ball valve at this time will not be seated and the air will be free to pass through the openings in the retaining member 27 and around the ball valve and through the port 24 into the space between the upper sealed end of the cylinder and the plug 19, from whence it can pass into the reservoir through one or more openings 28 formed in the cylinder 12. Likewise at this time any foam in the cylinder may pass outwardly thereof through the port 24. However, as soon as the oil starts to pass into the cage 25 and bear against the ball valve 26, the dynamic pressure of the flowing oil is sufficiently great to cause a seating of the valve and thus prohibit the passage of oil through the port 24. A spring plate 29 is secured at one end to the upper side of the plug 19 and extends across the port 24, such plate permitting the passage of air and foam through the port 24 to the outer side of the plug 19 while prohibiting the return of the air or foam into the cylinder 12 when the piston reverses its direction of movement.

By utilizing the higher dynamic pressure of flowing oil as compared to the dynamic pressure of the air or foam in the cylinder, the arrangement just described is capable of venting all of the air or foam from the cylinder 12 during a few strokes of the piston and thus eliminates the emulsification or foamy agitation of the oil in the cylinder with a resultant improvement in the operation of the shock absorber, it being understood that unless this air or foam were vented a condition would exist known as "starving" wherein there would be no shock absorbing resistance to the movement of the piston in the cylinder during at least a portion of the working stroke.

Figure 2:
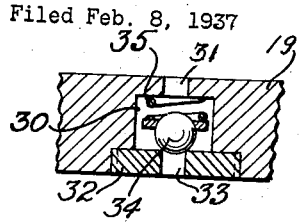
Fig. 2 is a fragmentary sectional view on a larger scale than Fig. 1 of a modified form of air venting control valve.

In Fig. 2 the air venting device is disclosed as comprising a recess 30 formed in the plug 19 and communicating at one of its ends with a bore 31 while its opposite end is closed by a closure plate 32 in which is an opening 33. A ball valve 34 is arranged in the recess and is held in a position adjacent the edge of the opening on the upper side of the plate 32 by means of weak coil spring 35 during the inward stroke of the piston 17.

When the piston 17 moves upwardly in the cylinder 12 the air, gas, or foam in the cylinder above the oil, as well as the air entrained in the oil, is compressed in the upper end of the cylinder above the oil and the dynamic pressure of such air or foam is sufficient to move the ball valve 34 against the action of the spring 35, wherefore the air, gas and foam can escape by passing through the opening 33, recess 30 and port 31 into the space between the plug 19 and the sealed end of the cylinder, from whence it passes through the opening 28 into the reservoir. As soon as the ball 34 is subjected to the dynamic pressure of the flowing oil such pressure is of sufficient magnitude to move the ball 34 to ated position against the inner edge that is the edge adjacent to the working chamber or cylinder of the port 31 thus sealing said port and preventing the escape of the oil therefrom. When the piston 17 moves in the reverse direction, that is downwardly, as viewed in the drawing, the spring 35 causes the ball 34 to seat against the upper edge of the opening 33 and seal the same against the return of air or foam into the upper end of the cylinder.

Figure 3:
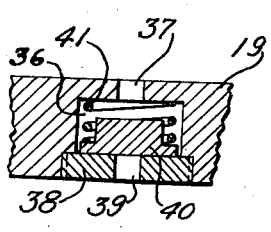
Figs. 3, 4 and 5 are views similar to Fig. 2, but each showing respectively a different modified form of air vent control valve.

In Fig. 3 a still different form of valve is illustrated which may be employed in the air venting means for the upper end of the cylinder. In this construction the plug 19 is provided with a recess 36 similar to the recess 30 and with a port 37 corresponding to the port 31 previously referred to. The inner or lower end of the recess 36 is closed by a plate 38 in which is located an opening preferably, although not necessarily, arranged in axial alignment with the port 37. A plate valve 40 is mounted in the recess 36 with sufficient clearance for movement therein and is provided with a circular portion about which is arranged a weak coil spring 41, one end of said coil spring abutting on the plate valve 40 and the opposite end thereof abutting the upper end of the recess 36. The spring 41 maintains the plate valve 40 in closed position during the inward movement of the piston 17, but during the outward movement thereof the dynamic pressure of the air and foam will open the plate valve and said air and foam will escape through the port 37 until the flowing oil exerts its dynamic pressure against the plate valve, whereupon the circular extension of the plate valve will engage the upper end of the recess 36 and seal the port 37 to prevent the passage of oil therethrough.

Figure 4:
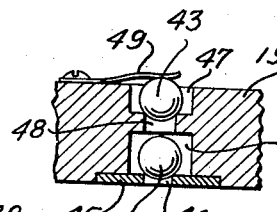

In Fig. 4 the air venting means includes two ball valves 42 and 43. The ball valve 42 is located in a recess 44 formed in the plug 19 and constituting, together with a closure plate 45, a cage for the ball, it being noted that the latter plate is provided with an opening 46. The ball valve 43 is mounted in a recess 47 formed adjacent the outer or upper side of the plug 19 and the recesses 47 and 44 are interconnected by a port or bore 48. The ball valve 43 is held by means of a weak plate spring 49 normally seated against the outer or upper edge of the port or passage 48, as clearly shown in Fig. 4. The ball valve 42 seats against the edge of the opening 46 in the plate 45 by means of gravity. As the piston 17 moves upwardly in the cylinder 12 the air and foam pressure will act to lift the ball valve 42 off its seat on the plate 45 but will not cause said ball valve to seat against the inner or lower end of the port 48. This air or foam pressure also will act to lift the ball valve 43 off its seat against the action of the weak spring 49 which is not strong enough to cause any substantial pressure to be built up by the air but merely serves to prevent the ball 43 from being displaced from the recess 47, whereby the air can escape from the interior of the cylinder. As soon as the dynamic pressure of the flowing oil is exerted against the ball valve 42, it will be seated against the inner end that is the end adjacent to the working cylinder or chamber of the bore or passage 48 and prevent the escape of any oil through said bore or passage. When the movement of the piston is reversed, that is, when it moves downwardly in the cylinder, the ball valve 42 will move to the position shown in Fig. 4 and the spring 49 and gravity or suction will act to seat the ball valve 43 against the outer end of the bore or passage 48, to thus prevent any air or foam returning to the upper end of the cylinder from the exterior thereof.

Figure 5:
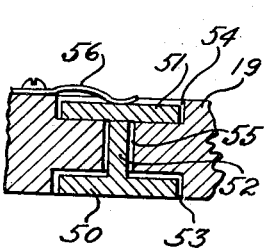

In Fig. 5 a still different form of valve is illustrated for the air venting means, in that a plate valve H-shaped in cross-section is utilized, and comprises parallel plate portions 50 and 51 connected by a cross portion 52. The portions 50 and 51 are located in recesses 53 and 54, respectively, formed on the opposite sides of the plug 19, and have suitable clearance therein, while the cross portion 52 is mounted with suitable clearance in a bore or passage 55 extending through the plug and connecting the recesses 53 and 54. The plate portion 51 is originally separate from the cross portion 52 and may be connected to the cross portion 52 after the latter has been positioned in the bore or passage 55 by suitable means such as welding, soldering or the like. A suitable spring, such as a leaf spring 56, is secured to the outer side of the plug 19 and bears against the outer side of the portion 51 and acts along with gravity and suction to normally maintain the inner side of said portion against the bottom of the recess 54 and seal the outer end of the bore or passage 55, wherefore while the piston 17 is moving inwardly in the cylinder no air, foam or other foreign matter can enter the interior of the cylinder at its outer end. As the piston 17 moves upwardly in the cylinder and compresses whatever air or foam might be therein or which might be entrained in the oil, this air or foam pressure acting against the lower side of the portion 50 of the valve raises said valve slightly, wherefore the air or foam can pass around the valve and through the bore or passage 55 and escape to the exterior of the cylinder 15. As soon as the dynamic pressure of the flowing oil acts on the lower side of the portion 50 of the valve, the raising movement thereof will be completed and the upper side of the portion 50 will seat against the upper side of the recess 53 and seal the bore or passage 55 against the flow of oil therethrough.

The springs 35 and 36 illustrated in the forms shown in Figs. 2 and 3 are primarily for the purpose of guiding or stabilizing the valves and could be omitted if desired. Likewise, the spring 49 shown in Fig. 4 is chiefly to hold the ball 43 in the recess 47, and could be omitted if other means were provided for this purpose. Similarly the spring 56 is not essential in the operation of the H-shaped valve and might be omitted if desired.

Figure 6:
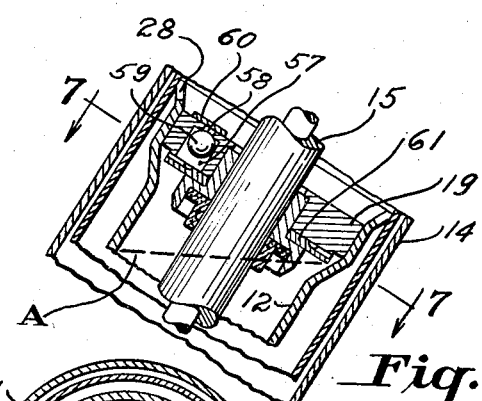
Fig. 6 is a fragmentary sectional view through a shock absorber having a further modified form of air venting means than that shown in the previous views, with the longitudinal axis of the shock absorber arranged at an angle to the vertical.
Figure 7:
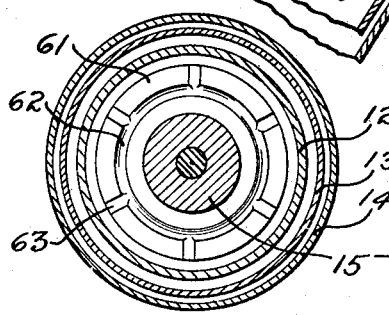
Fig. 7 is a transverse sectional view taken substantially on line 7—7 of Fig. 6 looking in the direction of the arrows.

In Figs. 6 and 7 there is illustrated a still further modification of the invention from any previously explained. In many installations of shock absorbers of the direct acting telescoping type, such as has been shown and described herein, the shock absorber is mounted on the vehicle with its axis inclined to the vertical and the modification of the invention now to be described has particular utility in connection with a direct acting shock absorber that is so mounted.

As previously stated, the cylinder 12 of the shock absorber should be substantially completely filled with oil, and when the shock absorber is disposed at an angle to the vertical it will be evident that the level of the oil in the upper end of the cylinder will be substantially horizontal, as indicated by the dash line A in Fig. 6, and, therefore, will extend across the cylinder so as to leave a space between the oil and the plug 19 at one side of the cylinder, while substantially contacting the plug at the opposite side of the cylinder. In order to facilitate the venting of the air or foam from the cylinder as the piston 17 moves upwardly therein when the shock absorber is arranged at an angle to the vertical, as thus referred to, the following construction is employed:

As described in connection with Fig. 1, the plug 19 is provided with a recess 57 and a port 58 communicating therewith and corresponding to the recesses 25 and port 24, respectively, illustrated in Fig. 1. A ball valve 59 is mounted in the recess 57 while a spring plate valve 60 is secured to the outer side of the plug 19 and closes the port 58 against the return of air or foam to the cylinder when the piston is moving in its inward direction in the cylinder.

A circular plate 61 is secured to the inner side of the plug 19 and said plate retains the ball valve 59 in the recess 57. The plate 61 is provided inwardly of its circumference with an annular groove 62, so positioned as to be in communication with the recess 57. A plurality of radially extending circumferentially spaced grooves or channels 63 communicate with the annular groove 62. When the piston 17 moves upwardly in the cylinder 12 any air or foam in the upper end of the cylinder, as well as any air entrained in the oil will pass with relatively high velocity through the grooves or channels 63 into the annular groove 62, and thence into the recess 57. The dynamic pressure of this high velocity air or foam will not be sufficient to cause the ball valve 59 to seat against the inner end of the port or passage 58, but will be sufficient to raise the spring 60 to permit such air or foam to escape quickly because of its high velocity to the exterior of the cylinder and into the reservoir through the port 28. However, as soon as the dynamic pressure of the oil which is caused to flow by the upward movement of the piston in the cylinder and which can pass through the channel 63 and groove 62 and act against the ball valve 59 commences to function, said ball valve will be moved to a seated position against the inner end of the bore or passage 58, as clearly shown in Fig. 6, and thus no oil will be allowed to escape to the exterior of the cylinder. When the piston 17 is moving inwardly of the cylinder 12 the spring valve 60 will prevent the return of air or other foreign matter to the interior of the upper end of the cylinder.

Although several embodiments of the invention have been illustrated and described herein, it should be understood that the invention is not to be limited thereto but is subject to various modifications and adaptations within the scope of the appended claims.

Having thus described my invention I claim:

1. A direct acting shock absorber comprising a cylinder adapted to be filled with oil or fluid, a housing surrounding said cylinder in spaced relation with the space therebetween constituting a reservoir for oil or fluid, a piston relatively movable in said cylinder and having a piston rod projecting exteriorly of one end of said housing and cylinder, a plug arranged within said cylinder adjacent said end thereof and through which said rod extends and provided with means forming a seal preventing the escape of oil around the rod, and means spaced outwardly of said plug and sealing said end of said cylinder and said housing against the escape of oil, and means carried by said plug for venting air or foam from said cylinder during the operation of the shock absorber but prohibiting the escape of oil or fluid therefrom and controlled by the differential in the dynamic pressures of the air or foam and the flowing oil.

2. A direct acting shock absorber comprising a cylinder adapted to be filled with oil or fluid, a housing surrounding said cylinder in spaced relation with the space therebetween constituting a reservoir for oil or fluid, a piston relatively movable in said cylinder and having a piston rod projecting exteriorly of one end of said housing and cylinder, means for sealing said end of said housing and cylinder, a plug arranged in said cylinder adjacent said end thereof and through which said rod extends and having means preventing the escape of oil from the cylinder around said rod during the operation of the shock absorber and provided with a bore placing the interior of the cylinder in communication with the space between said plug and said sealing means carried by said housing and cylinder, and a valve carried by said plug normally unseated with respect to the inner end of said bore whereby during the relative movement of the piston toward said plug air or foam will be vented through said bore but the dynamic pressure of the flowing oil or fluid will act on said valve to seat the same against the inner end of the bore to prevent the passage of oil or fluid therethrough.

3. A direct acting shock absorber comprising a cylinder adapted to be filled with oil or fluid, a housing surrounding said cylinder in spaced relation with the space therebetween constituting a reservoir for oil or fluid, a piston relatively movable in said cylinder and having a piston rod projecting exteriorly of one end of said housing and cylinder, means for sealing said end of said housing and cylinder, a plug arranged in said cylinder adjacent said end thereof and through which said rod extends and having means preventing the escape of oil from the cylinder around said rod during the operation of the shock absorber and provided with a bore placing the interior of the cylinder in communication with the space between said plug and said sealing means carried by said housing and cylinder, and a valve carried by said plug and normally unseated with respect to the inner end of the bore therein, and a plate secured to the inner side of said plug and provided with an annular groove in communication with said bore and with a radially extending groove communicating with said annular groove whereby during relative movement of the piston toward said plug air or foam can pass through said grooves and said bore to the exterior of the cylinder while the dynamic pressure of the oil or fluid flowing therethrough will act on said valve to seat the same against the inner end of the bore to prevent the escape of the oil or fluid from said cylinder.

4. A direct acting shock absorber comprising a cylinder adapted to be filled with oil or fluid, a housing surrounding said cylinder in spaced relation with the space therebetween constituting a reservoir for oil or fluid, a piston relatively movable in said cylinder and having a piston rod projecting exteriorly of one end of said housing and cylinder, means for sealing said end of said housing and cylinder, a plug arranged in said cylinder adjacent said end thereof and through which said rod extends and having means preventing the escape of oil from the cylinder around said rod during the operation of the shock absorber and provided with a bore placing the interior of the cylinder in communication with the space between said plug and said sealing means carried by said housing and cylinder, and a valve carried by said plug and normally unseated with respect to the inner end thereof, and a plate secured to the inner side of said plug and having an annular groove communicating with said bore and a plurality of grooves spaced circumferentially of the plate and communicating with the annular groove and extending to the circumferential edge of the plate whereby during relative movement of the piston toward said plug air or foam can pass through said grooves and said bore to the exterior of the cylinder while the dynamic pressure of the oil or fluid flowing therethrough will act on said valve to seat the same against the inner end of the bore to prevent the escape of the oil or fluid from said cylinder.

5. A direct acting shock absorber comprising a cylinder adapted to be filled with oil or fluid and having one of its ends closed by means of a plug mounted therein, a piston relatively movable in said cylinder and having a rod extending through said plug, said plug being provided with means forming a seal for preventing the escape of oil or fluid from the cylinder around said rod and also provided with a recess communicating with the interior of the cylinder and with a bore communicating with said recess and extending to the outer side of said plug, and a ball valve in said recess and normally unseated with respect to the inner end of said bore, said valve remaining unseated during the relative movement of the piston toward said plug while subjected to the dynamic pressure of air or foam whereby the same can escape from the cylinder through said bore but being moved to seated position against the inner end of the bore when subjected to the dynamic pressure of the flowing oil whereby the escape of oil or fluid through the bore is prevented.

6. A direct acting shock absorber comprising a cylinder adapted to be filled with oil or fluid and having one of its ends closed by means of a plug mounted therein, a piston relatively movable in said cylinder and having a rod extending through said plug, said plug being provided with means forming a seal for preventing the escape of oil or fluid from the cylinder and around said rod and also provided with a recess communicating with the interior of the cylinder and with a bore communicating with said recess and extending to the outer side of said plug, and a plate valve in said recess and normally unseated with respect to the inner end of said bore, said valve remaining unseated during the relative movement of the piston toward said plug while subjected to the dynamic pressure of air or foam whereby the same can escape from the cylinder through said bore by being moved to seated position against the inner end of the bore when subjected to the dynamic pressure of the flowing oil whereby the escape of oil or fluid through the bore is prevented.

7. A direct acting shock absorber comprising a cylinder adapted to be filled with oil or fluid and having one of its ends closed by means of a plug, a piston relatively movable in said cylinder and having a piston rod projecting exteriorly thereof through said plug, means carried by said plug and forming a seal preventing the escape of oil from the cylinder around said rod, and means including a spring also carried by said plug for venting air or foam from the cylinder during the relative movement of the piston toward said plug and for preventing the return of oil or foam into the cylinder during the relative movement of said piston away from said plug, said means being controlled in part by the differential in the dynamic pressures in the air or foam and the flowing oil.

8. A direct acting shock absorber comprising a cylinder adapted to be filled with oil or fluid and having one of its ends closed by means of a plug, a piston relatively movable in said cylinder and having a piston rod projecting exteriorly thereof through said plug, means carried by said plug and forming a seal preventing the escape of oil from the cylinder around said rod, and a single means also carried by said plug for venting air or foam from the cylinder during the relative movement of the piston toward said plug and for preventing the return of oil or foam into the cylinder during the relative movement of said piston away from said plug, said means controlled in part by the differential in the dynamic pressures in the air or foam and the flowing oil.

9. A direct acting shock absorber comprising a cylinder adapted to be filled with oil or fluid and having one of its ends closed by a plug mounted in the cylinder, a piston relatively movable in said cylinder and having a piston rod projecting through said plug exteriorly of the cylinder, means carried by said plug and forming a seal preventing the escape of oil from the cylinder around said rod, said plug being provided with a bore extending therethrough, means for closing said bore and responsive to the dynamic pressure of the flowing oil but unresponsive to the dynamic pressure of air or foam when said piston moves toward said plug, and means for closing said bore when said piston moves away from said plug to prevent the intake of air or foam into the cylinder.

10. A direct acting shock absorber comprising a cylinder adapted to be filled with oil or fluid, a housing surrounding said cylinder in spaced relation with the space therebetween constituting a reservoir for oil or fluid, a piston relatively movable in said cylinder and having a piston rod projecting exteriorly of one end of said housing and cylinder, a plug arranged within said cylinder adjacent said end thereof and through which said rod extends and provided with means forming a seal preventing the escape of oil around the rod, and means carried by said plug for venting air or foam from said cylinder during the operation of the shock absorber but prohibiting the escape of oil or fluid therefrom and controlled by the differential in the dynamic pressures of the air or foam and the flowing oil.

11. A direct acting shock absorber comprising a cylinder adapted to be filled with oil or fluid and having one of its ends closed by means of a plug, a piston relatively movable in said cylinder and having a piston rod projecting exteriorly thereof through said plug, and means carried by said plug for venting air or foam from the cylinder during the relative movement of the piston toward said plug and for preventing the return of oil or foam into the cylinder during the relative movement of said piston away from said plug, said means including a plate secured to the inner side of said plug and provided with an annular groove and with a radially extending groove communicating with said annular groove, said means being controlled in part by the differential in the dynamic pressures in the air or foam and the flowing oil.

12. A direct acting shock absorber comprising a cylinder adapted to be filled with oil or fluid and having one of its ends closed by means of a plug, a piston relatively movable in said cylinder and having a piston rod projecting exteriorly thereof through said plug, said plug being provided with a recess and a bore placing said recess in communication with the exterior of the plug, and means associated with said plug for venting air or foam from the cylinder during the relative movement of the piston toward said plug and including a valve mounted in said recess, and a plate secured to the inner side of said plug and provided with an annular groove in communication with said recess and bore and with a radially extending groove communicating with said annular groove, said means being controlled in part by the differential in the dynamic pressures in the air or foam and the flowing oil.

PETER-FRANZ GRAF BOPP von OBERSTADT, *Now by judicial change of name Peter Bopp Oberstadt.*